(12) United States Patent
Kiyota et al.

(10) Patent No.: US 10,134,119 B2
(45) Date of Patent: Nov. 20, 2018

(54) IMAGE GENERATION DEVICE AND OPERATION SUPPORT SYSTEM

(71) Applicant: Sumitomo Heavy Industries, Ltd., Tokyo (JP)

(72) Inventors: Yoshihisa Kiyota, Kanagawa (JP); Tomoko Ichikawa, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 72 days.

(21) Appl. No.: 15/214,356

(22) Filed: Jul. 19, 2016

(65) Prior Publication Data
US 2016/0328829 A1 Nov. 10, 2016

Related U.S. Application Data

(63) Continuation of application No. PCT/JP2014/077912, filed on Oct. 21, 2014.

(30) Foreign Application Priority Data

Jan. 21, 2014 (JP) .................................. 2014-009019

(51) Int. Cl.
*G09G 5/00* (2006.01)
*G06T 5/00* (2006.01)
(Continued)

(52) U.S. Cl.
CPC .............. *G06T 5/006* (2013.01); *E02F 9/261* (2013.01); *G06T 3/00* (2013.01); *G06T 5/002* (2013.01);
(Continued)

(58) Field of Classification Search
None
See application file for complete search history.

(56) References Cited

U.S. PATENT DOCUMENTS 5,768,410 A * 6/1998 Ohta .................... H04N 1/6016
345/600
5,982,946 A * 11/1999 Murakami ................ G06T 5/20
382/205
(Continued)

FOREIGN PATENT DOCUMENTS

EP 2 560 140 A1 2/2013
EP 2 560 385 A1 2/2013
(Continued)

OTHER PUBLICATIONS

Supplementary Search Report issued in European Patent Application No. 14880217.6, dated Aug. 28, 2017.

*Primary Examiner* — Anh-Tuan V Nguyen
(74) *Attorney, Agent, or Firm* — Michael Best & Friedrich LLP

(57) ABSTRACT

An image generation device generates an output image based on an input image captured by a camera attached to a shovel. Further, the image generation device includes an output image generation unit that associates a value of an input pixel in the input image with a value of an output pixel in the output image to generate the output image. A value of an output pixel specified by an integer coordinate point on an output image plane is determined based on values of two input pixels specified by two integer coordinate points selected from four integer coordinate points in the vicinity of a real number coordinate point on an input image plane corresponding to the integer coordinate point on the output image plane.

3 Claims, 11 Drawing Sheets

(51) Int. Cl.
*G06T 3/00* (2006.01)
*E02F 9/26* (2006.01)
*H04N 5/232* (2006.01)
*H04N 7/18* (2006.01)
*E02F 3/32* (2006.01)

(52) U.S. Cl.
CPC ......... *H04N 5/23293* (2013.01); *H04N 7/181* (2013.01); *E02F 3/32* (2013.01); *G06T 2207/20192* (2013.01); *G06T 2207/30232* (2013.01); *H04N 7/18* (2013.01)

(56) References Cited

U.S. PATENT DOCUMENTS

| | | | | |
|---|---|---|---|---|
| 6,134,346 | A * | 10/2000 | Berman | H04N 1/3872 345/629 |
| 6,292,195 | B1 * | 9/2001 | Shimizu | H04N 1/6058 345/427 |
| 6,315,731 | B1 * | 11/2001 | Okuno | G01S 7/52023 600/447 |
| 8,259,106 | B2 * | 9/2012 | Dammertz | G06T 11/001 345/420 |
| 8,593,454 | B2 | 11/2013 | Kiyota | |
| 2001/0022858 | A1 * | 9/2001 | Komiya | G06T 5/50 382/274 |
| 2004/0218828 | A1 * | 11/2004 | Aiso | G06T 3/40 382/254 |
| 2007/0139536 | A1 * | 6/2007 | Watanabe | H04N 5/772 348/231.99 |
| 2009/0043201 | A1 * | 2/2009 | Tanigawa | G01S 7/5206 600/443 |
| 2009/0284805 | A1 * | 11/2009 | Ichihashi | H04N 1/3935 358/448 |
| 2011/0032570 | A1 | 2/2011 | Imaizumi et al. | |
| 2013/0155241 | A1 * | 6/2013 | Tanuki | B60R 1/00 348/148 |
| 2014/0002746 | A1 * | 1/2014 | Bai | H04N 5/21 348/607 |
| 2015/0139499 | A1 * | 5/2015 | Shimizu | G06T 5/50 382/104 |
| 2015/0312556 | A1 * | 10/2015 | Cho | H04N 13/0207 348/43 |

FOREIGN PATENT DOCUMENTS

| | | |
|---|---|---|
| EP | 2 642 754 A1 | 9/2013 |
| JP | 2011-055467 A | 3/2011 |
| JP | H08-274983 A | 4/2011 |
| JP | 2011-221865 A | 11/2011 |
| WO | WO-97/08658 A1 | 10/1996 |
| WO | WO-00/30033 A1 | 5/2000 |
| WO | WO-00/33256 A1 | 6/2000 |

* cited by examiner

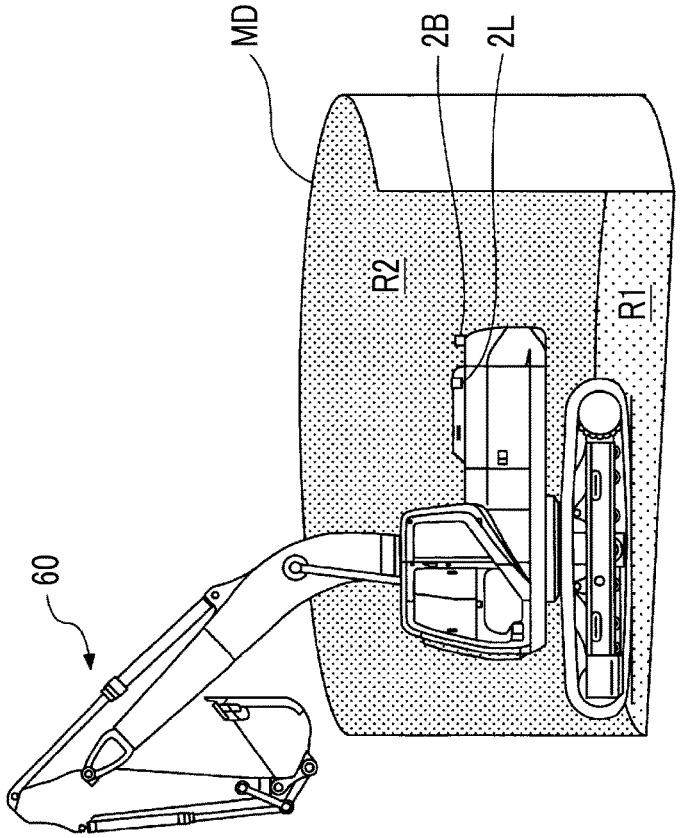
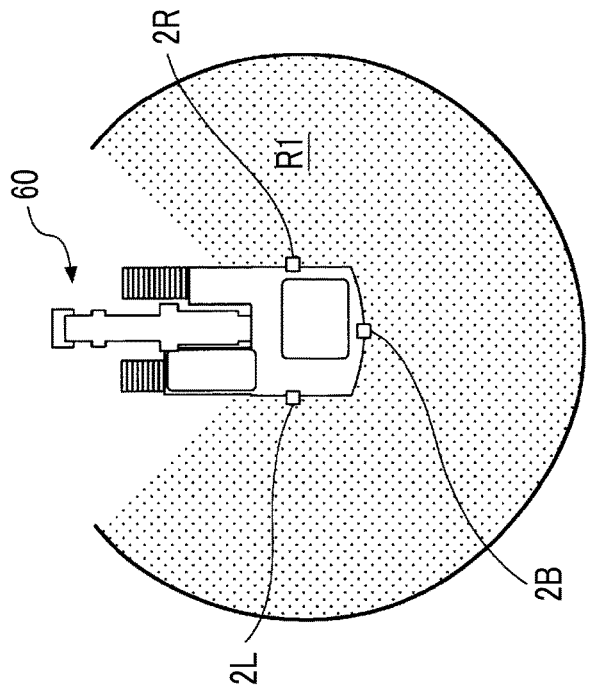
FIG. 3A
FIG. 3B

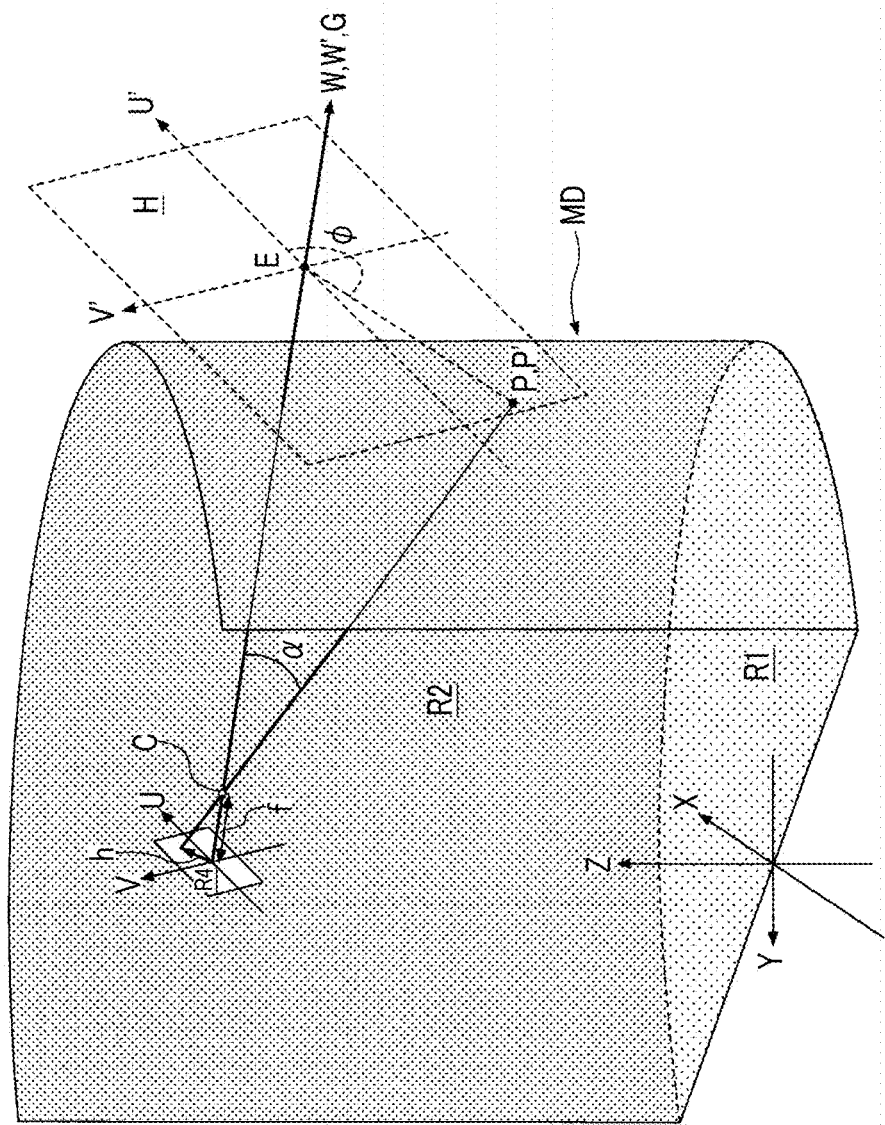

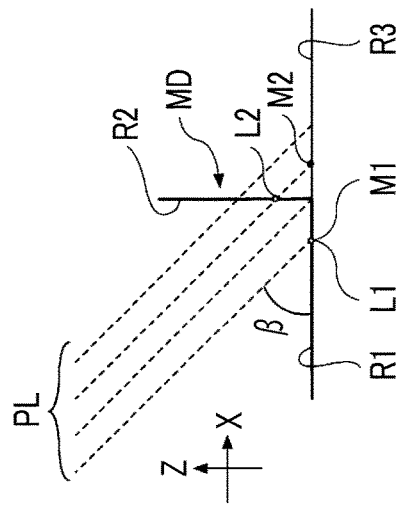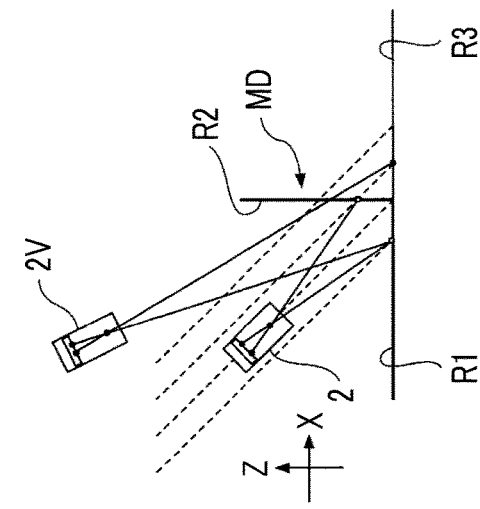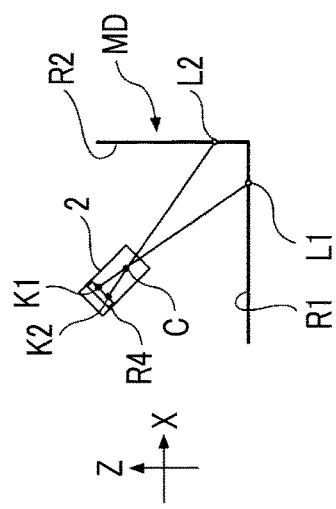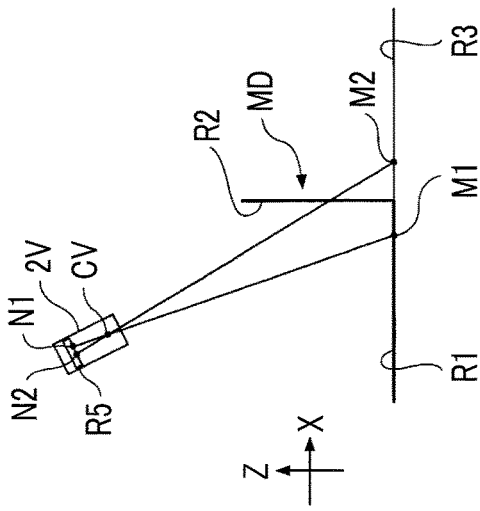

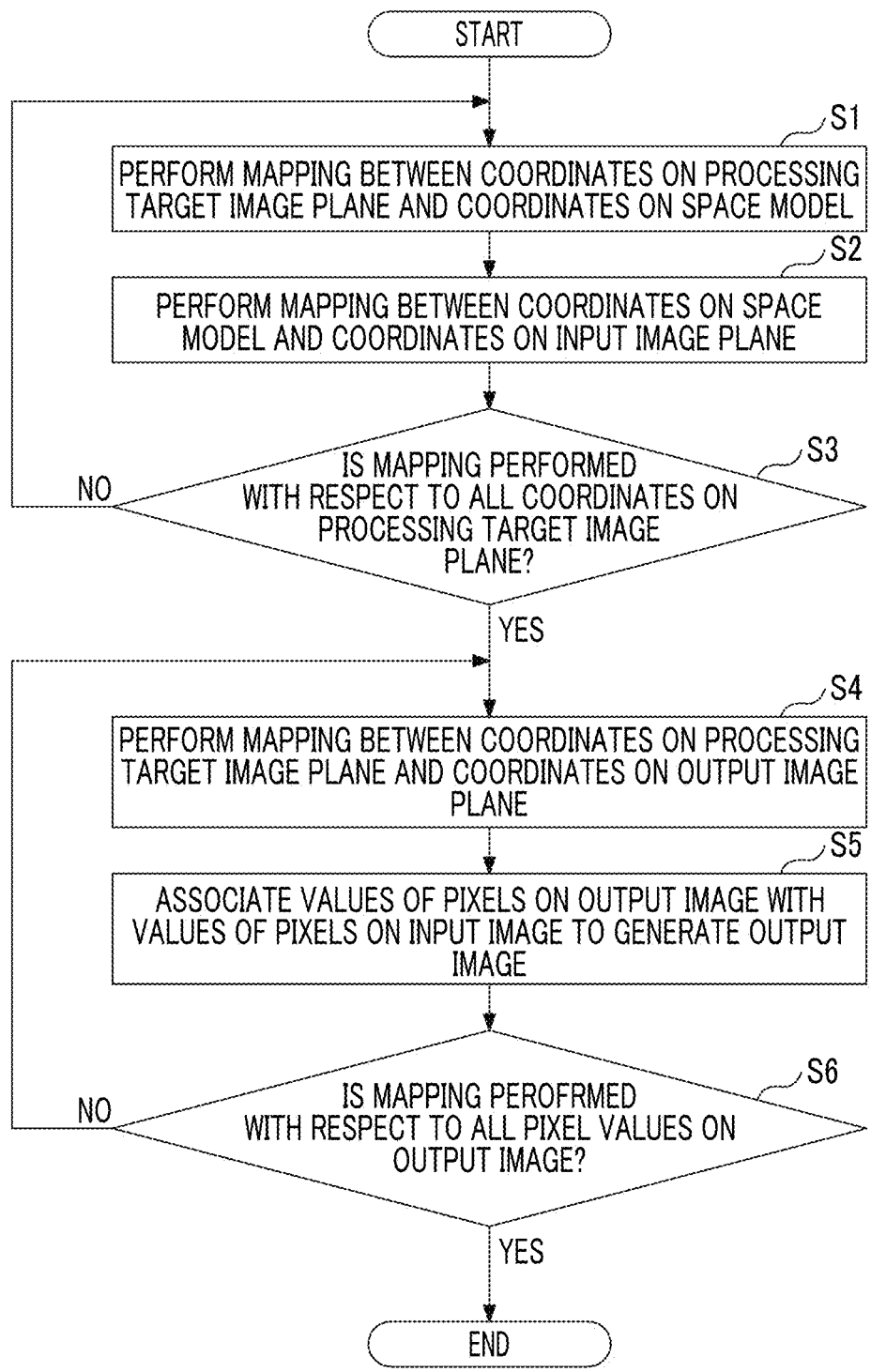

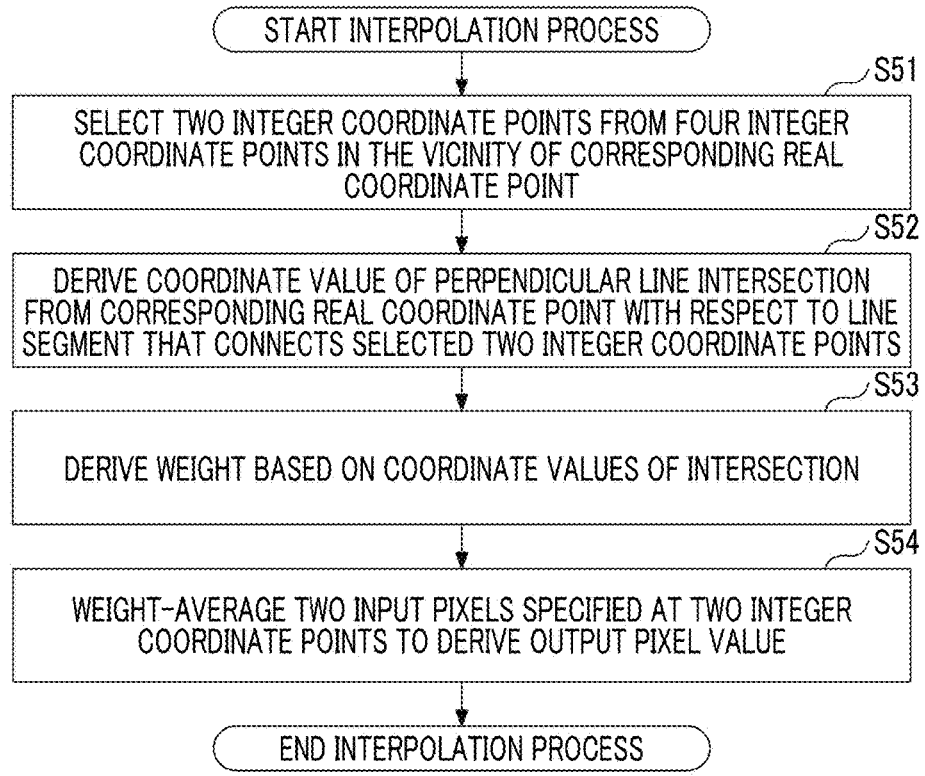

US 10,134,119 B2

IMAGE GENERATION DEVICE AND OPERATION SUPPORT SYSTEM

RELATED APPLICATIONS

This is a continuation of PCT/JP2014/077912 filed on Oct. 21, 2014. Priority is claimed on Japanese Patent Application No. 2014-009019, filed on Jan. 21, 2014, the content of which is incorporated herein by reference.

BACKGROUND

Technical Field

Certain embodiments of the present invention relate to an image generation device that generates an output image based on an input image captured by a camera attached to an operation target body and an operation support system using the image generation device.

Description of Related Art

In the related art, an image generation device that generates an output image based on an input image captured by a camera attached to an upper turning body of a shovel is known.

Since such an image generation device executes image processing including rotation of an input image, jaggies occur on an output image.

As a method for reducing jaggies, nearest neighbor interpolation, bilinear interpolation, bi-cubic interpolation, or the like is known.

SUMMARY

According to an aspect of the invention, there is provided an image generation device that generates an output image based on an input image captured by a camera attached to an operation target body, including: an output image generation unit that associates a value of an input pixel in an input image plane where the input image is positioned with a value of an output pixel in an output image plane where the output image is positioned to generate the output image, in which a value of an output pixel specified by an integer coordinate point on the output image plane is determined based on values of two input pixels specified by two integer coordinate points selected from four integer coordinate points in the vicinity of a real number coordinate point on the input image plane corresponding to the integer coordinate point on the output image plane.

Further, according to another aspect of the invention, there is provided an operation support system that supports a movement or an operation of an operation target body, including: the above-described image generation device; and a display unit that is provided in an operation room for moving or operating the operation target body and displays an output image generated by the image generation device.

Through the above-described means, it is possible to provide an image generation device capable of enhancing image quality while preventing an increase in operation load, and an operation support system using the image generation device.

BRIEF DESCRIPTION OF THE DRAWINGS

FIGS. 3A and 3B are diagrams illustrating an example of a space model to which an input image is projected.

FIG. 5 is a diagram illustrating mapping between coordinates on an input image plane and coordinates on a space model.

FIGS. 6A to 6D are diagrams illustrating mapping between coordinates and coordinates using a coordinate mapping unit.

FIG. 7 is a flowchart illustrating a flow of a processing target generation process and an output image generation process.

FIG. 12 is a flowchart illustrating a flow of the interpolation process.

FIG. 13 is a diagram illustrating a relationship between a decimal part dx of an X coordinate value and a decimal part dy of a Y coordinate value of a perpendicular line intersection, and a weight $\alpha$ of a first pixel value.

DETAILED DESCRIPTION

However, nearest neighbor interpolation cannot sufficiently reduce the jaggies. On the other hand, bilinear interpolation or the bi-cubic interpolation requires a large amount of computation with respect to the image generation device, which causes an increase in a manufacturing cost of the image generation device.

It is desirable to provide an image generation device capable of enhancing image quality while preventing an increase in an operation load and an operation support system using the image generation device.

Hereinafter, preferred embodiments for the invention will be described with reference to the accompanying drawings.

Figure 1:
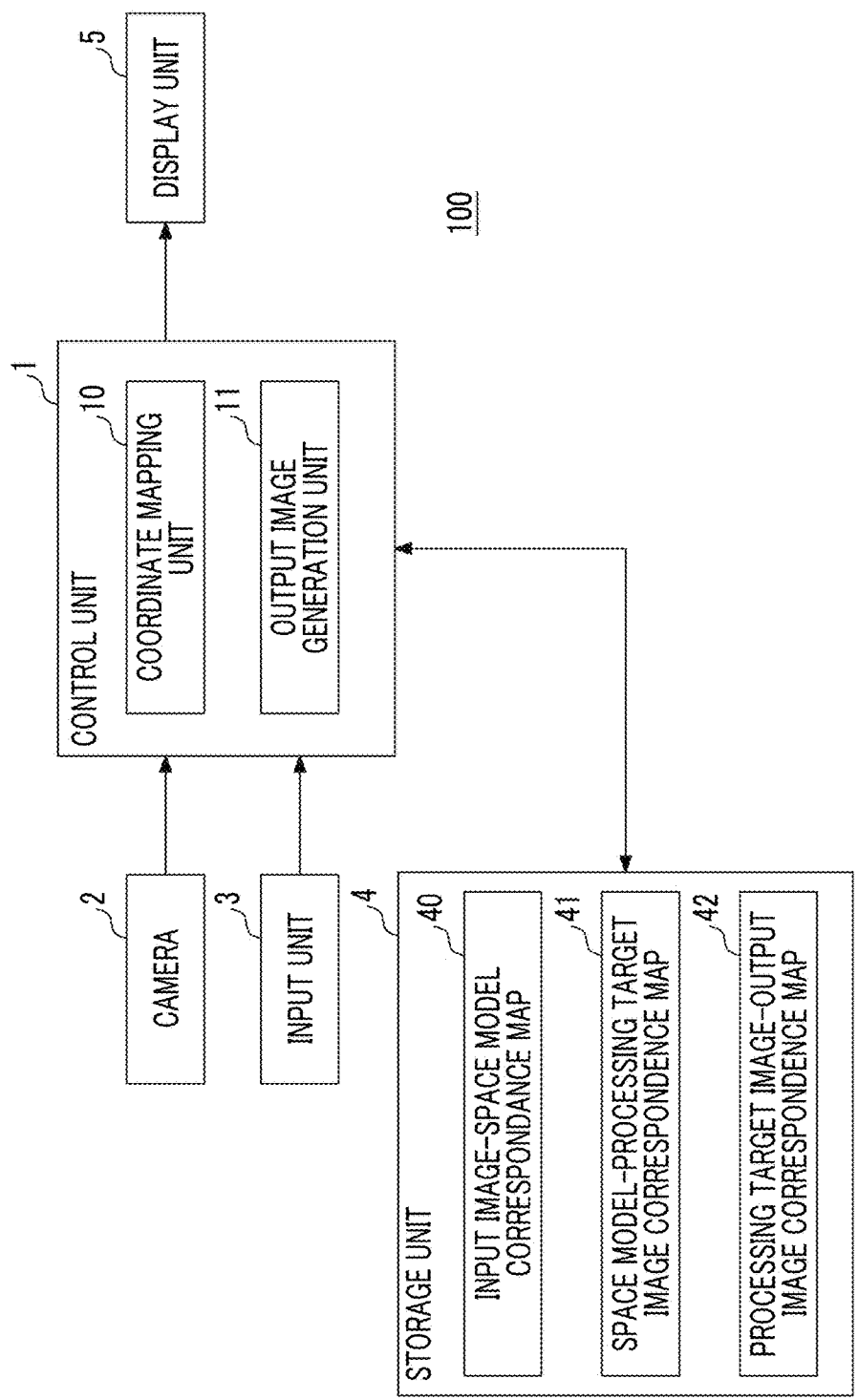
FIG. 1 is a block diagram schematically illustrating a configuration example of an image generation device according to an embodiment of the invention.

FIG. 1 is a block diagram schematically illustrating a configuration example of an image generation device 100 according to an embodiment of the invention.

The image generation device 100 is a device that generates an output image based on an input image captured by a camera 2 mounted on a construction machine and presents the output image to an operator, and includes a control unit 1, the camera 2, an input unit 3, a storage unit 4, and a display unit 5.

Figure 2:
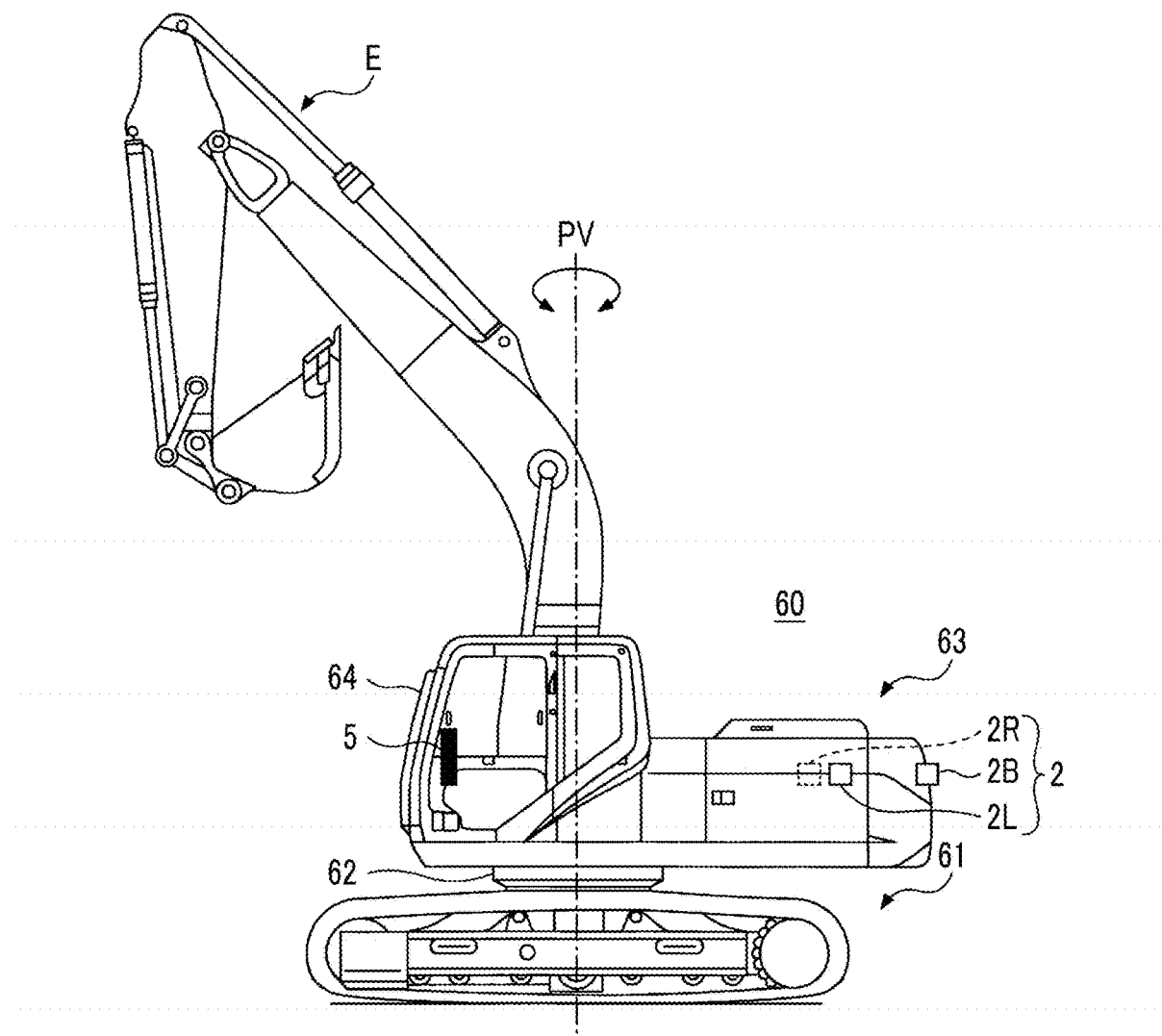
FIG. 2 is a diagram illustrating a configuration example of a shovel on which an image generation device is mounted.

FIG. 2 is a diagram illustrating a configuration example of a shovel 60 on which the image generation device 100 is mounted. The shovel 60 is configured so that an upper turning body 63 is mounted to be turned around a pivot PV on a lower traveling body 61 of a crawler type through a turning mechanism 62.

Further, the upper turning body 63 includes a cab (operator's cab) 64 in a front left part thereof, includes a drilling attachment E in a front center part thereof, and includes the camera 2 (a right-side camera 2R, a left-side camera 2L, and a rear camera 2B) on a right surface, a left surface, and a rear surface thereof. The display unit 5 is provided at a position that is easily viewed by the operator in the cab 64.

Then, the respective components of the image generation device 100 will be described.

A control unit 1 is a computer that includes a central processing unit (CPU), a random access memory (RAM), a read only memory (ROM), a non-volatile random access memory (NVRAM), and the like. The control unit 1 stores programs respectively corresponding to a coordinate mapping unit 10 and an output image generation unit 11 (which will be described later) in the ROM or the NVRAM, and causes the CPU to execute processes corresponding to the respective units while using the RAM as a temporary storage region.

The camera 2 is a device for acquiring an input image that reflects the periphery of the shovel 60, and for example, is attached to the right side surface, the left side surface, and the rear surface of the upper turning body 63 so that a region which becomes a blind spot with respect to the operator in the cab 64 can be imaged (see FIG. 2).

Further, the camera 2 acquires an input image according to a control signal from the control unit 1, and outputs the acquired input image to the control unit 1.

The input unit 3 is a device through which the operator can input a variety of information to the image generation device 100, and for example, is a touch panel, a button switch, a pointing device, a keyboard, or the like.

The storage unit 4 is a device for storing a variety of information, and for example, is a hard disk, an optical disc, a semiconductor memory, or the like.

The display unit 5 is a device for displaying image information, and for example, is a liquid crystal display, a projector, or the like, provided in the cab 64 (see FIG. 2) in the construction machine. The display unit 5 displays various images output by the control unit 1.

Further, the image generation device 100 generates a processing target image based on an input image, and performs an image conversion process with respect to the processing target image to generate an output image. In addition, the image generation device 100 presents the output image to the operator, so that the operator can recognize a positional relation or a distance sense between the shovel 60 and a peripheral obstacle.

The "processing target image" refers to an image generated based on an input image. Further, the processing target image refers to an image which is a target of an image conversion process such as scale conversion, affine conversion, distortion conversion or visual point conversion, for example. Further, the processing target image is obtained by projecting an input image to a predetermined space model, and then, re-projecting a projection image projected to the space model to another two-dimensional plane. In a case where the input image is used in an image conversion process, the projection to the space model is performed to prevent the input image from being unnaturally displayed. Specifically, in a case where an input image obtained by imaging the ground by a camera from above and including a three-dimensional object (for example, a peripheral obstacle) having a height due to a wide angle of view is used in an image conversion process, the projection to the space model is performed to prevent an unnatural display of the three-dimensional object (peripheral obstacle). The processing target image may be used as an output image as it is without performing the image conversion process.

The "space model" refers to an input image projection target that includes one or plural planes or curved surfaces including a plane other than a processing target image plane which is a plane where the processing target is placed or a curved surface. The plane other than the processing target image plane or the curved surface is a plane parallel with the processing target image plane or a plane that forms an angle with respect to the processing target image plane, or a curved surface, for example.

The image generation device 100 may perform an image conversion process with respect to a projection image projected to the space model without generating a processing target image to generate an output image. Further, the projection image may be used as an output image as it is without performing the image conversion process.

FIGS. 3A and 3B are diagrams illustrating an example of a space model MD to which an input image is projected, in which FIG. 3A shows a relationship between the shovel 60 and the space model MD when the shovel 60 is seen from the side, and FIG. 3B shows a relationship between the shovel 60 and the space model MD when the shovel 60 is seen from the top.

As shown in FIGS. 3A and 3B, the space model MD has an approximately cylindrical shape, and includes a plane region R1 inside a bottom surface thereof and a curved surface region R2 on an inner side surface thereof.

Figure 4:
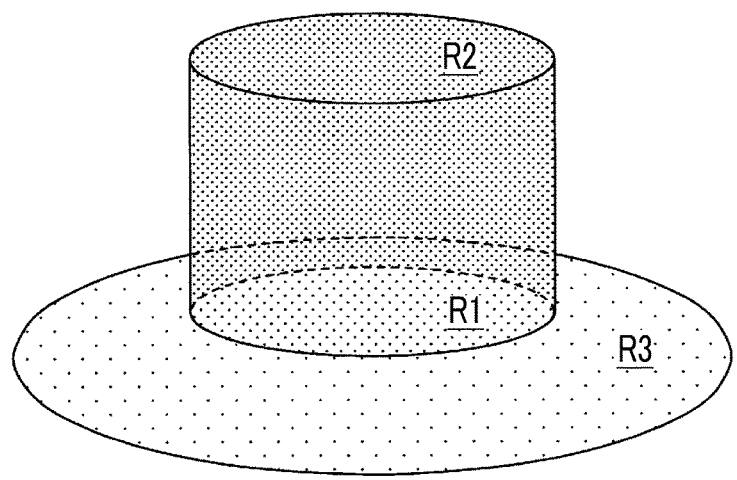
FIG. 4 is a diagram illustrating a relationship between a space model and a processing target image plane.

Further, FIG. 4 shows an example of a relationship between the space model MD and a processing target image plane. As shown in FIG. 4, a processing target image plane R3 is a plane including the plane region R1 of the space model MD. FIG. 4 shows that the space model MD is a cylindrical shape instead of the approximately cylindrical shape as shown in FIGS. 3A and 3B for clarity of description, but the space model MD may be either the approximately cylindrical shape or the cylindrical shape. This is similarly applied to the following drawings. In addition, the processing target image plane R3 may be a circular region including the plane region R1 of the space model MD as described above, or may be an annular region that does not include the plane region R1 of the space model MD.

Next, various units of the control unit 1 will be described.

The coordinate mapping unit 10 is a unit that performs mapping between coordinates on an input image plane where an input image captured by the camera 2 is placed, coordinates on the space model MD, and coordinates on the processing target image plane R3. Further, the coordinate mapping unit 10 performs mapping between the coordinates on the input image plane, the coordinates on the space model MD, and the coordinates on the processing target image plane R3 on the basis of various parameters relating to the camera 2 and a predetermined mutual positional relationship between the input image plane, the space model MD, and the processing target image plane R3. Further, the coordinate mapping unit 10 stores their correspondence relationship in an input image-space model correspondence map 40 and a space model-processing target image correspondence map 41 of the storage unit 4. The various parameters relating to the camera 2 includes an optical center, a focal distance, a CCD size, an optical axial vector, a camera horizontal vector, a projection type or the like of the camera 2, and may be predetermined values or may be values input through the input unit 3.

In a case where a processing target image is not generated, the coordinate mapping unit 10 do not perform mapping between the coordinates on the space model MD and the coordinates on the processing target image plane R3, and storage of their correspondence relationship in the space model-processing target image correspondence map 41.

The output image generation unit 11 is a unit that generates an output image, and for example, performs mapping between the coordinates on the processing target image plane R3 and coordinates on an output image plane where the output image is placed by performing scale conversion, affine conversion, or distortion conversion with respect to a processing target image. Further, the output image generation unit 11 stores their correspondence relationship in a processing target image-output image correspondence map 42 of the storage unit 4. In addition, the output image generation unit 11 associates values of respective pixels in an output image with values of respective pixels in an input image to generate an output image, with reference to the input image-space model correspondence map 40 and the space model-processing target image correspondence map 41. The values of the respective pixels include a luminance value, a hue value, a chroma value, or the like.

Further, the output image generation unit 11 performs mapping between the coordinates on the processing target image plane R3 and the coordinates on the output image plane on the basis of various parameters relating to a virtual camera, and stores their correspondence relationship in the processing target image-output image correspondence map 42 of the storage unit 4. Further, the output image generation unit 11 associates values of respective pixels in an output image with values of respective pixels in an input image to generate an output image, with reference to the input image-space model correspondence map 40 and the space model-processing target image correspondence map 41. The various parameters relating to the virtual camera include an optical center, a focal distance, a CCD size, an optical axial vector, a camera horizontal vector, a projection type or the like of the virtual camera, and may be predetermined values or values input through the input unit 3.

The output image generation unit 11 may change the scale of a processing target image to generate an output image without using the concept of the virtual camera.

Further, in a case where a processing target image is not generated, the output image generation unit 11 performs mapping between the coordinates on the space model MD and the coordinates on the output image plane according to a performed image conversion process. Further, the output image generation unit 11 associates values of respective pixels in an output image with values of respective pixels in an output image to generate an output image, with reference to the input image-space model correspondence map 40. In this case, the output image generation unit 11 do not perform mapping between the coordinates on the space model MD and the coordinates on the processing target image plane R3, and storage of their correspondence relationship in the processing target image-output image correspondence map 42.

Next, an example of specific processes in the coordinate mapping unit 10 and the output image generation unit 11 will be described.

The coordinate mapping unit 10 may perform mapping between coordinates on an input image plane and coordinates on a space model using a Hamiltonian quaternion, for example.

FIG. 5 is a diagram illustrating mapping between coordinates on an input image plane and coordinates on a space model. In FIG. 5, an input image plane of the camera 2 is represented as one plane in a UVW orthogonal coordinate system in which an optical center C of the camera 2 is the origin, and the space model is represented as a three-dimensional surface in an XYZ orthogonal coordinate system.

The coordinate mapping unit 10 first linearly moves the origin of the XYZ coordinate system to the optical center C (the origin of the UVW coordinate system), and then, rotates the XYZ coordinate system so that an X-axis matches a U-axis, a Y-axis matches a V-axis, and a Z-axis matches a −W-axis. Thus, the coordinates on the space model (coordinates on the XYZ coordinate system) are converted into the coordinates on the input image plane (coordinates on the UVW coordinate system). Sign "−" in the −W-axis means that a direction thereof is reverse to the direction of the Z-axis. This is because the UVW coordinate system sets the front of the camera as a +W direction and the XYZ coordinate system sets a vertically downward direction as a −Z direction.

In a case where plural cameras 2 are present, each camera 2 has an individual UVW coordinate system. Thus, the coordinate mapping unit 10 linearly moves and rotates the XYZ coordinate system with respect to each of the plural UVW coordinate systems.

The above-mentioned conversion is realized by linearly moving the XYZ coordinate system so that the optical center C of the camera 2 becomes the origin of the XYZ coordinate system, and then, by rotating the XYZ coordinate system so that the Z-axis matches the −W-axis and rotating the XYZ coordinate system so that the X-axis matches the U-axis. The coordinate mapping unit 10 may describe this conversion by the Hamiltonian quaternion, to thereby reduce the two rotations into one-time rotational operation.

Here, a rotation for matching a certain vector A with another vector B corresponds to a process of rotating the vector A by an angle formed by the vector A and the vector B using a normal line with respect to a plane formed by the vector A and the vector B as an axis. Here, when the angle is θ, the angle θ is expressed by Expression (1) from an inner product of the vector A and the vector B.

$$\theta = \cos^{-1}\left(\frac{A \cdot B}{|A||B|}\right) \quad \text{[Expression 1]}$$

Further, a unit vector N of the normal line of the plane formed by the vector A and the vector B is expressed by Expression (2) from an outer product of the vector A and the vector B.

$$N = \frac{A \times B}{|A||B|\sin\theta} \quad \text{[Expression 2]}$$

In a case where i, j, and k are respectively set in the unit of imaginary numbers, the quaternion is a hypercomplex number that satisfies Expression (3).

$$ii=jj=kk=ijk=-1 \quad \text{[Expression 3]}$$

In this embodiment, a quaternion Q is expressed by Expression (4) where a real component is t and pure imaginary components are a, b, and c.

$$Q=(t;a,b,c)=t+ai+bj+ck \quad \text{[Expression 4]}$$

Further, a conjugate quaternion of the quaternion Q is expressed by Expression (5).

$$Q^*=(t;-a,-b,-c)=t-ai-bj-ck \quad \text{[Expression 5]}$$

The quaternion Q may represent a three-dimensional vector (a, b, c) using the pure imaginary components a, b, and c in a state where the real component t is 0 (zero), and may represent a rotational operation using an arbitrary vector as an axis based on the respective components of t, a, b, and c.

Further, the quaternion Q may integrate plural times of continuous rotational operations to express the result as a one-time rotational operation, and for example, may represent a point D(ex, ey, ez) when an arbitrary point S(sx, sy, sz) is rotated by an angle θ using an arbitrary unit vector C(l, m, n) as an axis, as follows.

$$D = (0; ex, ey, ez) = QSQ^* \text{R. L,} \quad \text{[Expression 6]}$$

$$S = (0; sx, sy, sz),$$

$$Q = \left(\cos\frac{\theta}{2}; l\sin\frac{\theta}{2}, m\sin\frac{\theta}{2}, n\sin\frac{\theta}{2}\right)$$

Here, in this embodiment, when a quaternion indicating a rotation for matching the Z-axis with the −W-axis is represented as Qz, since a point X on the X-axis in the XYZ coordinate system is moved to a point X', the point X' is expressed by Expression (7).

$$X' = Q_z X Q_z^* \quad \text{[Expression 7]}$$

Further, in this embodiment, when a quaternion indicating a rotation for matching a line that connects the point X' on the X-axis and the origin with the U-axis is represented as Qx, a quaternion R indicating a "rotation for matching the Z-axis with the −W-axis and matching the X-axis with the U-axis" is expressed by Expression (8).

$$R = Q_x Q_z \quad \text{[Expression 8]}$$

Coordinates P' when arbitrary coordinates P on the space model (XYZ coordinate system) are represented as coordinates on the input image plane (UVW coordinate system) are expressed by Expression (9).

$$P' = RPR^* \quad \text{[Expression 9]}$$

Since the quaternion R does not change in each camera 2, the coordinate mapping unit 10 may convert the coordinates on the space model (XYZ coordinate system) into the coordinates on the input image plane (UVW coordinate system) only by executing the calculation thereafter.

After converting the coordinates on the space model (XYZ coordinate system) into the coordinates on the input image plane (UVW coordinate system), the coordinate mapping unit 10 calculates an incident angle α formed by a line segment CP' that connects the optical center C (coordinates of the UVW coordinate system) of the camera 2 and the coordinates P' represented in the UVW coordinate system corresponding to the arbitrary coordinates P on the space model, and the optical axis G of the camera 2.

Further, the coordinate mapping unit 10 calculates a deflection angle φ formed by a line segment EP' that connects, in a plane H which is parallel to an input image plane R4 (for example, a CCD surface) of the camera 2, an intersection E between the plane H and the optical axis G and the coordinates P', and includes the coordinates P', and a U'-axis on the plane H, and the length of the line segment EP'.

In an optical system of a camera, since an image height h is normally a function of the incident angle α and the focal distance f, the coordinate mapping unit 10 calculates the image height h by selecting an appropriate projection method such as a normal projection (h=f tan α), an orthographic projection (h=f sin α), a stereographic projection (h=2f tan(α/2)), an equisolid angle projection (h=2f sin(α/2)), or an equidistant projection (h=fα).

Then, the coordinate mapping unit 10 resolves the calculated image height h into a U component and a V component on the UV coordinate system by the deflection angle φ and divides the result by a numerical value corresponding to a pixel size per pixel of the input image plane R4, to perform mapping between the coordinates P (P') on the space model MD and the coordinates on the input image plane R4.

When a pixel size per pixel of the input image plane R4 in a U-axis direction is represented as $a_U$ and a pixel size per pixel of the input image plane R4 in a V-axis direction is represented as $a_V$, coordinates (u, v) on the input image plane R4 corresponding to the coordinates P (P') on the space model MD are expressed by Expression (10) and Expression (11).

$$u = \frac{h\cos\phi}{a_U} \quad \text{[Expression 10]}$$

$$v = \frac{h\sin\phi}{a_V} \quad \text{[Expression 11]}$$

In this way, the coordinate mapping unit 10 performs mapping between the coordinates on the space model MD and one or plural sets of coordinates on the input image planes R4 which are present for each camera, and stores the coordinates on the space model MD, a camera identifier, and the coordinates on the input image plane R4 in the input image-space model correspondence map 40 in association.

Further, since the coordinate mapping unit 10 performs an operation for coordinate conversion using a quaternion, there is an advantage that gimbal lock does not occur, compared with a case where the operation for coordinate conversion is performed using an Euler angle. However, the invention is not limited to the operation for coordinate conversion using the quaternion, and the coordinate mapping unit 10 may perform the operation for coordinate conversion using an Euler angle.

In a case where mapping to plural coordinates on the input image plane R4 is possible, the coordinate mapping unit 10 may perform mapping between the coordinates P (P') on the space model MD and the coordinates on the input image plane R4 relating to a camera of which the incident angle α is the smallest, or may perform mapping between the coordinates P (P') on the space model MD and coordinates on the input image plane R4 selected by an operator.

Next, a process of re-projecting coordinates (coordinates having a component in a Z-axis direction) on the curved surface region R2 among the coordinates on the space model MD to the processing target image plane R3 on an XY plane will be described.

FIGS. 6A to 6D are diagrams illustrating mapping between coordinates and coordinates using the coordinate mapping unit 10. Further, FIG. 6A is a diagram illustrating a correspondence relationship between coordinates on the input image plane R4 and coordinates on the space model MD, of the camera 2 that employs the normal projection (h=f tan α), as an example. As shown in FIG. 2, the coordinate mapping unit 10 performs mapping between coordinates and coordinates so that respective line segments that connect the coordinates on the input image plane R4 and the coordinates on the space model MD corresponding to the coordinates, of the camera 2, passes through the optical center C of the camera 2.

In an example of FIG. 6A, the coordinate mapping unit 10 performs mapping from coordinates K1 on the input image plane R4 of the camera 2 to coordinates L1 on the plane region R1 of the space model MD, and performs mapping from coordinates K2 on the input image plane R4 of the camera 2 to coordinates L2 on the curved surface region R2 of the space model MD. Here, both of a line segment K1-L1 and a line segment K2-L2 pass through the optical center C of the camera 2.

In a case where the camera 2 employs a projection method (for example, an orthographic projection, a stereographic projection, an equisolid angle projection, an equidistant projection, or the like) other than the normal projection, the coordinate mapping unit 10 performs mapping from the coordinates K1 and K2 on the input image plane R4 of the camera 2 to the coordinates L1 and L2 on the space model MD according to each projection method.

Specifically, the coordinate mapping unit 10 performs mapping between the coordinates on the input image plane and the coordinates on the space model MD, on the basis of a predetermined function (for example, the orthographic projection (h=f sin α), the stereographic projection (h=2f tan (α/2)), the equisolid angle projection (h=2f sin(α/2)), the equidistant projection (h=fα), or the like). In this case, the line segment K1-L1 and the line segment K2-L2 do not pass through the optical center C of the camera 2.

FIG. 6B is a diagram illustrating a correspondence relationship between coordinates on the curved surface region R2 of the space model MD and coordinates on the processing target image plane R3. As shown in FIG. 6B, the coordinate mapping unit 10 introduces a parallel line group PL which is placed on an XZ plane and forms an angle β with respect to the processing target image plane R3, and performs mapping between coordinates and coordinates so that both of coordinates on the curved surface region R2 of the space model MD and coordinates on the processing target image plane R3 corresponding to the former coordinates are placed on one of the parallel line group PL.

In an example of FIG. 6B, the coordinate mapping unit 10 performs mapping coordinates and coordinates so that coordinates L2 on the curved surface region R2 of the space model MD and coordinates M2 on the processing target image plane R3 are placed on a common parallel line.

The coordinates mapping unit 10 may perform mapping from coordinates on the plane region R1 of the space model MD to coordinates on the processing target image plane R3 using the parallel line group PL, similar to the coordinates on the curved surface region R2. However, in the example of FIG. 6B, since the plane region R1 and the processing target image plane R3 forms a common plane, the coordinates L1 on the plane region R1 of the space model MD and the coordinates M1 on the processing target image plane R3 have the same coordinate values.

In this way, the coordinate mapping unit 10 performs mapping between the coordinates on the space model MD and the coordinates on the processing target image plane R3, and stores the coordinates on the space model MD and the coordinates on the processing target image plane R3 in the space model-processing target image correspondence map 41 in association.

FIG. 6C is a diagram illustrating a correspondence relationship between coordinates on the processing target image plane R3 and coordinates on an output image plane R5 of a virtual camera 2V that employs a normal projection (h=f tan α), for example. As shown in FIG. 6C, the output image generation unit 11 performs mapping between coordinates and coordinates so that respective line segments that connect the coordinates on the output image plane R5 and the coordinates on the processing target image plane R3 corresponding to the coordinates, of the virtual camera 2V, pass through the optical center CV of the virtual camera 2V.

In an example of FIG. 6C, the output image generation unit 11 performs mapping from coordinates N1 on the output image plane R5 of the virtual camera 2V to coordinates M1 on the processing target image plane R3 (plane region R1 of the space model MD), and performs mapping from coordinates N2 on the output image plane R5 of the virtual camera 2V to coordinates M2 on the processing target image plane R3. Here, both of a line segment M1-N1 and a line segment M2-N2 pass through the optical center CV of the virtual camera 2V.

In a case where the virtual camera 2V employs a projection method (for example, an orthographic projection, a stereographic projection, an equisolid angle projection, an equidistant projection, or the like) other than the normal projection, the output image generation unit 11 performs mapping from the coordinates N1 and N2 on the output image plane R5 of the virtual camera 2V to the coordinates M1 and M2 on the processing target image plane R3, according to each projection method.

Specifically, the output image generation unit 11 performs mapping between coordinates on the output image plane R5 and coordinates on the processing target image plane R3 on the basis of a predetermined function (for example, an orthographic projection (h=f sin α), a stereographic projection (h=2f tan(α/2)), an equisolid angle projection (h=2f sin(α/2)), or an equidistant projection (h=fα)). In this case, the line segment M1-N1 and the line segment M2-N2 do not pass through the optical center CV of the virtual camera 2V.

In this way, the output image generation unit 11 performs mapping between the coordinates on the output image plane R5 and the coordinates on the processing target image plane R3, stores the coordinates on the output image plane R5 and the coordinates on the processing target image plane R3 in the processing target image-output image correspondence map 42 in association, and associates values of respective pixels in an output image with values of respective pixels in an input image to generate an output image, with reference to the input image-space model correspondence map 40 and the space model-processing target image correspondence map 41 stored by the coordinate mapping unit 10.

FIG. 6D is a diagram illustrating a combination of FIG. 6A to FIG. 6C, which shows a mutual position relationship between the camera 2, the virtual camera 2V, the plane region R1 and the curved region R2 of the space model MD, and the processing target image plane R3.

Next, a process of generating a processing target image by the image generation device 100 (hereinafter, referred to as a "processing target image generation process"), and a process of generating an output image using the generated processing target image (hereinafter, referred to as an "output image generation process") will be described with reference to FIG. 7. FIG. 7 is a flowchart illustrating a flow of the processing target image generation process (step S1 to step S3) and the output image generation process (step S4 to step S6). Further, arrangement of the camera 2 (input image plane R4), the space model (plane region R1 and curved surface region R2), and the processing target image plane R3 is determined in advance.

First, the control unit 1 performs mapping between coordinates on the processing target image plane R3 and coordinates on the space model MD by the coordinate mapping unit 10 (step S1).

Specifically, the coordinate mapping unit 10 acquires an angle formed by the parallel line group PL and the processing target image plane R3, and calculates a point at which one line of the parallel line group PL that extends from specific coordinates on the processing target image plane R3 intersects the curved surface region R2 of the space model MD. Further, the coordinate mapping unit 10 derives coordinates on the curved surface region R2 corresponding to the calculated point as specific coordinates on the curved surface region R2 corresponding to the specific coordinates on the processing target image region R3, and stores their correspondence relationship in the space model-processing target image correspondence map 41. The angle formed by the parallel line group PL and the processing target image plane R3 may be a value stored in advance in the storage unit 4 or the like, or may be a value dynamically input by an operator through the input unit 3.

Further, in a case where the specific coordinates on the processing target image plane R3 match specific coordinates on the plane region R1 of the space model MD, the coordinate mapping unit 10 derives the specific coordinates on the plane region R1 as specific coordinates corresponding to the specific coordinates on the processing target image plane R3, and stores their correspondence relationship in the space model-processing target image correspondence map 41.

Then, the control unit 1 performs mapping between the specific coordinates on the space model MD derived in the above-described process and the coordinates on the input image plane R4 by the coordinate mapping unit 10 (step S2).

Specifically, the coordinate mapping unit 10 acquires coordinates of the optical center C of the camera 2 that employs the normal projection (h=f tan α), and calculates a point at which a line segment that extends from specific coordinates on the space model MD and passes through the optical center C intersects the input image plane R4. Further, the coordinate mapping unit 10 derives coordinates on the input image plane R4 corresponding to the calculated point as specific coordinates on the input image plane R4 corresponding to the specific coordinates on the space model MD, and stores their correspondence relationship in the input image-space model correspondence map 40.

Then, the control unit 1 determines whether mapping from all coordinates on the processing target image plane R3 to coordinates on the space model MD and coordinates on the input image plane R4 is performed (step S3). In a case where it is determined that the mapping is not yet performed with respect to all the coordinates (NO in step S3), the processes of step S1 and step S2 are repeated.

On the other hand, in a case where it is determined that the mapping is performed with respect to all the coordinates (YES in step S3), in a state where the process target image generation process is terminated, the control unit 1 starts the output image generation process. Then, mapping between the coordinates on the processing target image plane R3 and the coordinates on the output image plane R5 is performed by the output image generation unit 11 (step S4).

Specifically, the output image generation unit 11 generates an output image by performing scale conversion, affine conversion, or distortion conversion with respect to a processing target image, and stores a correspondence relationship between coordinates on the processing target image plane R3 and coordinates on the output image plane R5, determined by the contents of the performed scale conversion, affine conversion, or distortion conversion in the processing target image-output image correspondence map 42.

Alternatively, in a case where an output image is generated using the virtual camera 2V, the output image generation unit 11 may calculate the coordinates on the output image plane R5 from the coordinates on the processing target image plane R3 according to an employed projection method, and may store their correspondence relationship in the processing target image-output image correspondence map 42.

Alternatively, in a case where an output image is generated using the virtual camera 2V that employs the normal projection (h=f tan α), in a state where coordinates of the optical center CV of the virtual camera 2V are acquired, the output image generation unit 11 calculates a point at which a line segment that extends from specific coordinates on the output image plane R5 and passes through the optical center CV intersects the processing target image plane R3. Further, the output image generation unit 11 may derive coordinates on the processing target image plane R3 corresponding to the calculated point as specific coordinates on the processing target image plane R3 corresponding to the specific coordinates on the output image plane R5, and may store their correspondence relationship in the processing target image-output image correspondence map 42.

Then, the control unit 1 makes reference to the input image-space model correspondence map 40, the space model-processing target image correspondence map 41, and the processing target image-output image correspondence map 42 by the output image generation unit 11. Further, the control unit 1 follows the correspondence relationship between the coordinates on the input image plane R4 and the coordinates on the space model MD, the correspondence relationship between the coordinates on the space model MD and the coordinates on the processing target image plane R3, and the correspondence relationship between the coordinates on the processing target image plane R3 and the coordinates on the output image plane R5. In addition, the control unit 1 acquires a value (for example, a luminance value, a hue value, a chroma value, or the like) of a pixel specified by the coordinates on the input image plane R4 corresponding to each set of coordinates on the output image plane R5. Furthermore, the control unit 1 employs the acquired value as a value of a pixel specified by each set of coordinates on the corresponding output image plane R5 (step S5). That is, the output image generation unit 11 associates values of pixels in an output image with values of pixels in an input image to generate an output image. In a case where plural sets of coordinates on the plural input image planes R4 correspond to one set of coordinates of the output image plane R5, the output image generation unit 11 may derive a statistic value (for example, an average value, a maximum value, a minimum value, a middle value, or the like) based on respective values of plural pixels specified by the plural sets of coordinates on the plural input image planes R4, and may employ the statistic value as a value of one pixel specified by one set of coordinates on the output image plane R5.

Then, the control unit 1 determines whether mapping from all pixel values on the output image to pixel values on the input image is performed (step S6), and in a case where it is determined that the mapping is not yet performed with respect to all the pixel values (NO in step S6), the processes of step S4 and step S5 are repeated.

On the other hand, in a case where it is determined that the mapping is performed with respect to all the pixel values (YES in step S6), the control unit 1 generates an output image and terminates the series of processes.

When the image generation device 100 does not generate a processing target image, the processing target image generation process is not performed, and "coordinates on a processing target image plane" in step S4 in the output image generation process is read as "coordinates on a space model".

With such a configuration, the image generation device 100 can generate a processing target image and an output image capable of causing an operator to intuitively recognize a positional relationship between a construction machine and peripheral obstacles.

Further, the image generation device 100 can thereby reliably perform mapping between each set of coordinates on the processing target image plane R3 and one or plural sets of coordinates on the input image plane R4 by executing coordinate mapping so as to go back to the input image plane R4 from the processing target image plane R3 through the space model MD. Further, the image generation device 100 can generate an excellent processing target image at high speed, compared with a case where coordinate mapping is executed in the order from the input image plane R4 to the processing target image plane R3 through the space model MD. In a case where the coordinate mapping is executed in the order from the input image plane R4 to the processing target image plane R3 through the space model MD, it is not possible to reliably perform mapping between each set of coordinates on the input image plane R4 and one or plural sets of coordinates on the processing target image plane R3. However, there is a case where mapping from a part of the sets of the coordinates on the processing target image plane R3 to any set of coordinates on the input image plane R4 is not performed. In this case, it is necessary to perform an interpolation process or the like with respect to a part of the sets of the coordinates on the processing target image plane R3.

Further, in a case where only an image corresponding to the curved surface region R2 of the space model MD is enlarged or reduced, the image generation device 100 simply changes the angle formed by the parallel line group PL and the processing target image plane R3 and re-writes only a portion relating to the curved surface region R2 in the space model-processing target image correspondence map 41, to thereby make it possible to realize desired enlargement or reduction without re-writing the content of the input image-space model correspondence map 40.

Further, in a case where a visual performance of an output image is changed, the image generation device 100 simply changes values of various parameters relating to scale conversion, affine conversion or distortion conversion and re-writes the processing target image-output image correspondence map 42, to thereby make it possible to generate a desired output image (a scale-converted image, an affine-converted image or a distortion-converted image) without re-writing the content of the input image-space model correspondence map 40 and the space model-processing target image correspondence map 41.

Similarly, in a case where a viewpoint of an output image is changed, the image generation device 100 simply changes values of various parameters of the virtual camera 2V and re-writes the processing target image-output image correspondence map 42, to thereby make it possible to generate an output image (viewpoint-converted image) seen from a desired viewpoint without re-writing the content of the input image-space model correspondence map 40 and the space model-processing target image correspondence map 41.

Figure 8:
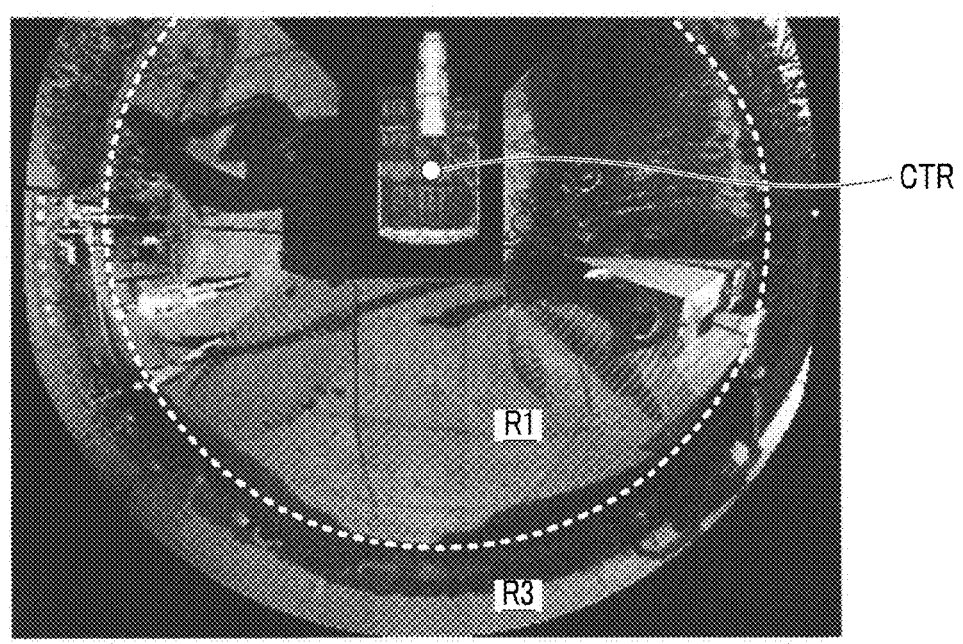
FIG. 8 shows a display example of an output image.

Next, a configuration example of an output image will be described with reference to FIG. 8. FIG. 8 is a display example when an output image generated using input images of three cameras 2 (a right-side camera 2R, a left-side camera 2L, and a rear camera 2B) mounted on the shovel 60 is displayed on the display unit 5.

The image generation device 100 re-projects the respective input images from the three cameras 2 to the processing target image plane R3, in a state of being projected to the plane region R1 and the curved surface region R2 of the space model MD, to generate a processing target image. Further, the image generation device 100 generates an output image by performing an image conversion process (for example, scale conversion, affine conversion, distortion conversion, viewpoint conversion, or the like) with respect to the generated processing target image. In addition, the image generation device 100 simultaneously displays an image (image in the plane region R1) obtained when performing imaging while looking down the vicinity of the shovel 60 from the sky and an image (image in the processing target image plane R3) obtained when performing imaging while viewing the periphery from the shovel 60 in the horizontal direction.

In a case where the image generation device 100 does not generate a processing target image, the output image is generated by performing an image conversion process (for example, viewpoint conversion) with respect to an image projected to the space model MD.

Further, the output image is circularly trimmed so that an image can be displayed without discomfort when the shovel 60 performs a turning operation, and is generated so that the center CTR of the circle is on the pivot PV of the shovel 60 on a cylindrical central axis of the space model MD, and is displayed to rotate around the center CTR according to the turning operation of the shovel 60. In this case, the cylindrical central axis of the space model MD may or may not match a re-projection axis.

The radius of the space model MD is 5 meters, for example. In a case where an object (for example, an operator) is present at a position spaced away from the turning center of the shovel 60 by a maximum arrival distance (for example, 12 meters) of the drilling attachment E, the angle formed by the parallel line group PL and the processing target image plane R3 may be set so that the object is sufficiently largely (for example, 7 meters or larger) displayed on the display unit 5.

Further, in the output image, a computer graphics (CG) image of the shovel 60 may be disposed so that the front of the shovel 60 matches an upper portion of the screen of the display unit 5 and the turning center of the shovel 60 matches the center CTR. Thus, it is possible to easily understand a positional relationship between the shovel 60 and the object in the output image. At the periphery of the output image, frame images including a variety of information such as directions may be arranged.

Figure 9A:
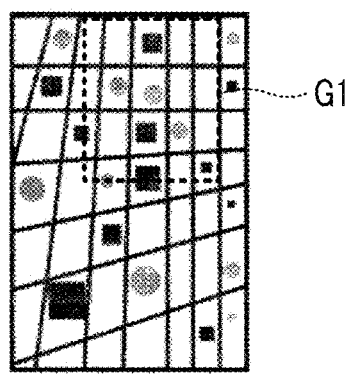
FIGS. 9A to 9C are diagrams illustrating an effect of an interpolation process using output image generation unit.
Figure 9B:
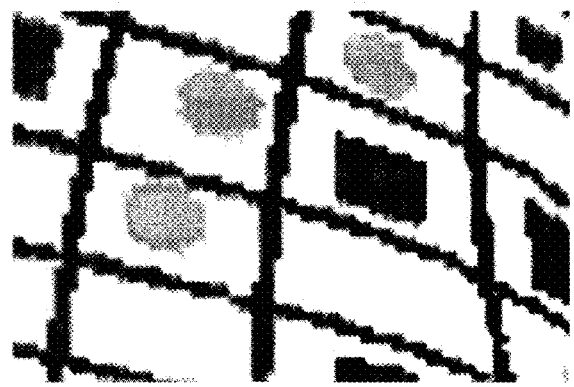
Figure 9C:
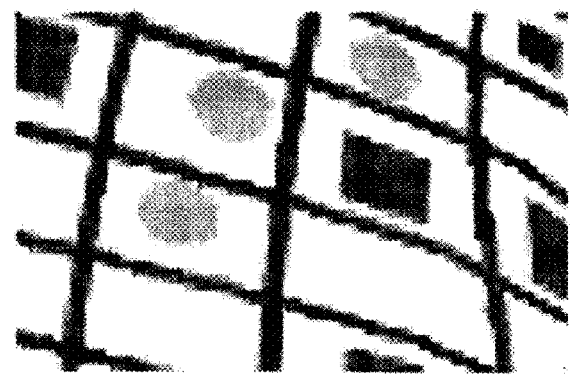

Next, jaggies generated in an output image will be described with reference to FIGS. 9A to 9C. FIGS. 9A to 9C are diagrams illustrating effects of an interpolation process performed by the output image generation unit 11. FIG. 9A shows an input image, FIG. 9B shows an output image for which an interpolation process is not performed, and FIG. 9C shows an output image for which an interpolation is performed. Further, the output images of FIGS. 9B and 9C are images obtained by rotating a part of an input image indicated by a dotted-line region G1 in FIG. 9A in a counterclockwise direction and enlarging the result.

Jaggies occur in contours of a raster image, and for example, are generated due to a rounding error when a real number coordinate point on an input image plane is converted into an integer coordinate point so as to rotate an input image to generate an output image.

Both of coordinate values for specifying a pixel on the input image and coordinate values for specifying a pixel on the output image are represented as integer values. However, when coordinates on the input image plane corresponding to coordinates on the output image plane are derived, the coordinate values on the input image plane may be calculated as real number values (including a decimal part). In this case, the real number values may be converted into integer values through rounding off values after the decimal point, for example. This is because it is not possible to use the real number values as the coordinate values for specifying the pixel on the input image. Accordingly, the pixel (hereinafter, referred to an "output pixel") specified by an integer coordinate point on the output image plane is associated with a pixel specified by an integer coordinate point which is closest to a real number coordinate point on the input image plane. Further, for example, even when a real number coordinate point is present between two integer coordinate points for specifying two pixels having totally different luminance values, the pixel on the output image is associated with a pixel specified by one of two integer coordinate points on the input image plane. In addition, a value of a pixel specified by the other one of two integer coordinate points is not reflected in the value of the pixel on the output image. As a result, a contour of each image included in the output image is jagged.

In this way, the jaggies occur due to a rounding error in rounding off. Further, the jaggies are more noticeable as the resolution of the display unit 5 becomes lower.

Thus, the output image generation unit 11 reduces the jaggies using the interpolation process described with reference to FIGS. 10 and 11.

Figure 10:
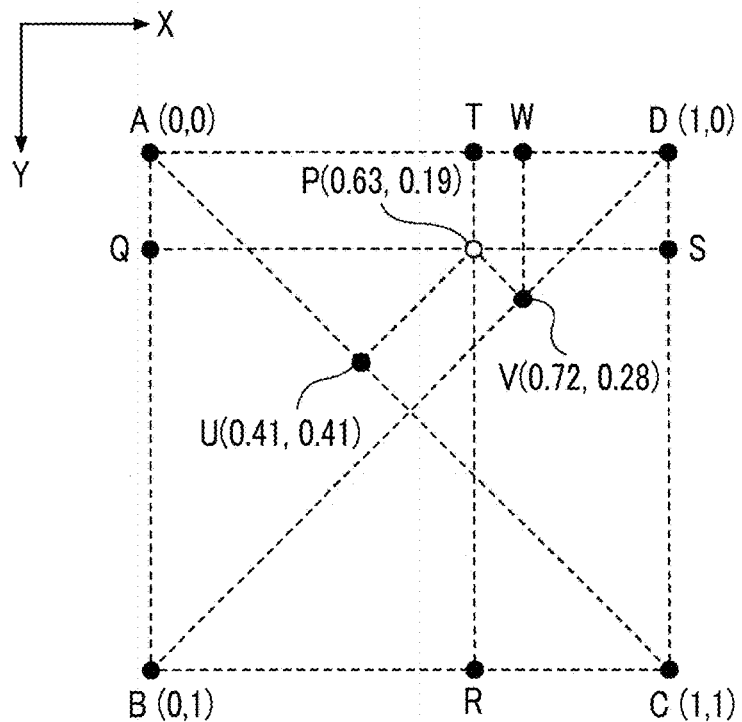
FIG. 10 is a diagram schematically illustrating an interpolation process.

FIG. 10 is a diagram schematically illustrating an interpolation process, which shows a part of an input image plane. The input image plane is represented by an XY orthogonal coordinate system, and includes integer coordinate points A(0, 0), B(0, 1), C(1, 1), and D(1, 0). Further, FIG. 11 is a functional block diagram illustrating a configuration example of the output image generation unit 11.

Figure 11:
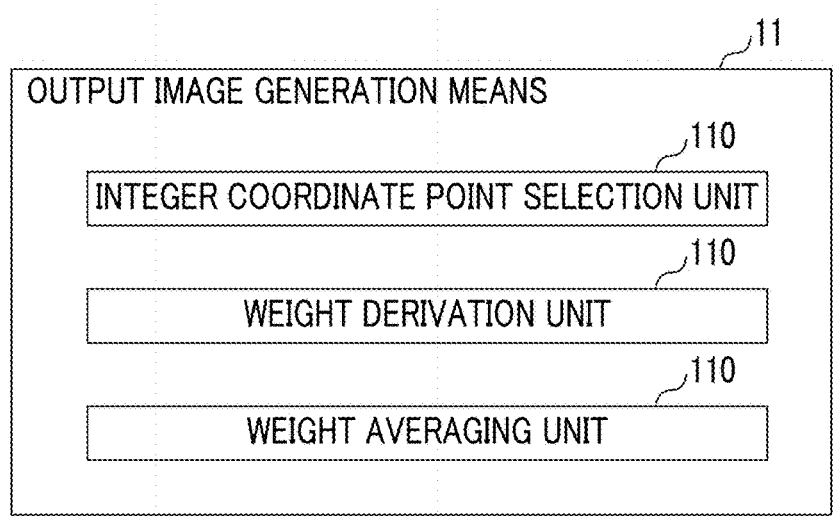
FIG. 11 is a functional block diagram illustrating a configuration example of the output image generation unit.

In this embodiment, as shown in FIG. 11, the output image generation unit 11 includes an integer coordinate point selection unit 110, a weight derivation unit 111, and a weight averaging unit 112.

The integer coordinate point selection unit 110 is a functional element that selects two integer coordinate points from two or more integer coordinate points which are close to a real number coordinate point (hereinafter, referred to as a "corresponding real number coordinate point") on an input image plane corresponding to an output pixel. In this embodiment, the corresponding real number coordinate point is a coordinate point derived by the output image generation unit 11 using the relationship described with reference to FIG. 5 and FIGS. 6A to 6D. Further, in this embodiment, the integer coordinate point selection unit 110 selects two integer coordinate points from four integer coordinate points in the vicinity of the corresponding real number coordinate point. Specifically, as shown in FIG. 10, four integer coordinates in the vicinity of the corresponding real number coordinate point P (0.63, 0.19) are A(0, 0), B(0, 1), C(1, 1), and D(1, 0). Further, the integer coordinate point selection unit 110 selects one of six combinations (pairs of integer coordinate points) of A-B, A-C, A-D, B-C, B-D, and C-D.

In this embodiment, the integer coordinate point selection unit 110 draws a perpendicular line from the corresponding real number coordinate point P to each of six line segments AB, AC, AD, BC, BD, and CD. Further, the integer coordinate point selection unit 110 selects a perpendicular line PV which is shortest from six perpendicular lines PQ, PR, PS, PT, PU, and PV and a line segment BD relating to the perpendicular line PV, and selects two integer coordinate points B and D relating to the line segment BD.

Further, in this embodiment, an interval between integer coordinate points in the X-axis direction and the Y-axis direction is normalized as value "1", and four integer coordinate points A, B, C, and D form a square. Thus, Y coordinate values of real number coordinate points Q(0.00, 0.19) and S(1.00, 0.19) are all equal to a Y coordinate value of the corresponding real number coordinate point P (0.63, 0.19). Similarly, X coordinate values of real number coordinate points R(0.63, 1.00) and T(0.63, 0.00) are equal to an X coordinate value of the corresponding real number coordinate point P(0.63, 0.19).

Further, since a real number coordinate point U (0.41, 0.41) is a real number coordinate point on the line segment AC, an increment of an X coordinate value and an increment of a Y coordinate value with respect to the real number coordinate point A are equal to each other. Similarly, with respect to a real number coordinate point on the line segment PV, an increment of an X coordinate value and an increment of a Y coordinate value with respect to the corresponding real number coordinate point P are equal to each other.

In addition, since a real number coordinate point V(0.72, 0.28) is a real number coordinate point on the line segment BD, an increment of an X coordinate value and an increment of a Y coordinate value with respect to the integer coordinate point B are equal to each other. Similarly, with respect to a real number coordinate point on the line segment UP, an increment of an X coordinate value and an increment of a Y coordinate value with respect to the real number coordinate point U are equal to each other.

Thus, an X coordinate value and a Y coordinate value of the real number coordinate point U are all "0.41" obtained by dividing a sum "0.82" of the X coordinate value and the Y coordinate value of the corresponding real number coordinate point P by 2. Further, an X coordinate value of the real number coordinate point V is "0.72" obtained by adding "0.09" obtained by dividing "0.18" obtained by subtracting the sum "0.82" from the value "1" by 2 to "0.63" which is the X coordinate value of the corresponding real number coordinate point P. Further, a Y coordinate value of the real number coordinate point V is "0.28" obtained by adding "0.09" obtained by dividing the difference "0.18" by 2 to "0.19" which is the Y coordinate value of the corresponding real number coordinate point P.

In this way, the coordinate values of the real number coordinate points Q to V may be directly derived from the coordinate values of the corresponding real number coordinate point P, or may be derived through simple operations such as addition, subtraction, or division into two equal parts. Thus, the above-described selection method for selecting two integer coordinate points from four integer coordinate points in the vicinity of the corresponding real number coordinate point is a selection method suitable for a binary arithmetic operation.

The weight derivation unit 111 is a functional element that derives a weight of each input pixel value when an output pixel value is determined from two pixels (hereinafter, referred to as "input pixels") values specified by two selected integer coordinate points.

In this embodiment, in a case where two integer coordinate points B and D are selected, the weight derivation unit 111 derives a ratio of the length of the line segment BV to the length of the line segment BD as a weight α of the input pixel value specified by the integer coordinate point D. Further, the weight derivation unit 111 derives a ratio of the length of the line segment VD to the length of the line segment BD as a weight β (=1−α) of the input pixel value specified by the integer coordinate point B.

Specifically, as shown in FIG. 10, a decimal part of the X coordinate value of the real number coordinate point V corresponds to a ratio of the length of the line segment AW to the length "1" of the line segment AD. The real number coordinate point W is an intersection of a perpendicular line drawn from the real number coordinate point V with respect to the line segment AD. Further, the ratio of the length of the line segment BV to the length of the line segment BD is equal to the ratio of the length of the line segment AW to the length of the line segment AD. Thus, the weight derivation unit 111 employs the decimal part of the X coordinate value of the real number coordinate point V as the weight α of the input pixel value specified by the integer coordinate point D. Further, the weight derivation unit 111 employs a decimal part of the Y coordinate value of the real number coordinate point V as the weight β of the input pixel value specified by the integer coordinate point B. The decimal part of the Y coordinate value of the real number coordinate point V corresponds to 1−α which is a value obtained by subtracting the decimal part of the X coordinate value of the real number coordinate point V from the value "1". In this way, the weight derivation unit 111 directly derives the weights α and β from the coordinate values of the corresponding real number coordinate point P, to thereby make it possible to omit a relatively complicated arithmetic operation such as calculation of the ratios.

The weight averaging unit 112 is a functional element that weight-averages two input pixel values. In this embodiment, the weight averaging unit 112 weight-averages two input pixel values using the weights α and β derived by the weight derivation unit 111. Specifically, the weight averaging unit 112 multiplies a value of one pixel (hereinafter, referred to as a "first pixel") among two input pixels by the weight α, to calculate a contribution amount of the first pixel value in an output pixel value. Further, the weight averaging unit 112 multiplies a value of the other pixel (hereinafter, referred to as a "second pixel") among the two input pixels by the weight β, to calculate a contribution amount of the second pixel value in the output pixel value. In addition, the weight averaging unit 112 derives a weighted average of two input pixel values which is the sum of the contribution amount of the first pixel value and the contribution amount of the second pixel value as the output pixel value.

For example, in a case where luminance values of two input pixels specified by the integer coordinate points B and D are weight-averaged, the weight averaging unit 112 uses the coordinate values of the real number coordinate point V. Specifically, the weight averaging unit 112 multiplies a luminance value of an input pixel (first pixel) specified by the integer coordinate point D by the decimal part (weight α) of the X coordinate value of the real number coordinate point V to calculate a contribution amount of the luminance value of the first pixel. Further, the weight averaging unit 112 multiplies a luminance value of an input pixel (second pixel) specified by the integer coordinate point B by the decimal part (weight β) of the Y coordinate value of the real number coordinate point V to calculate a contribution amount of the luminance value of the second pixel. In addition, the weight averaging unit 112 adds up the contribution amount of the luminance value of the first pixel and the contribution amount of the luminance value of the second pixel to derive a luminance value of an output pixel.

Further, in the above-described embodiment, a case where the perpendicular line PV is shortest is described, but the same description may be applied to a case where another perpendicular line is shortest.

The above-described interpolation method is applied to a case where the corresponding real number coordinate point P is present at a position other than four integer coordinate points A to D. Thus, in a case where the corresponding real number coordinate point P is present at any one of the integer coordinate points A to D, the output image generation unit 11 employs a value of one input pixel specified by the corresponding real number coordinate point P which is an integer coordinate point as an output pixel value as it is, without executing selection of two integer coordinate points, weight derivation and weight averaging. Further, in a case where there are two or more shortest perpendicular lines among six perpendicular lines, the output image generation unit 11 determines selection of which one among the perpendicular lines of the same length in advance. For example, the output image generation unit 11 may select one perpendicular line based on a predetermined priority. Further, the above-described interpolation method is applied to a case where both of the X coordinate value and the Y coordinate value of the corresponding real number coordinate point P are 0 or greater and 1 or less, but the interpolation method may be similarly applied to a case where the X coordinate value and the Y coordinate value of the corresponding real number coordinate point P are i or greater and i+1 or smaller (i is an integer).

Then, a flow of an interpolation process of deriving one output pixel value using two input pixel values by the output image generation unit 11 will be described with reference to FIG. 12. FIG. 12 is a flowchart illustrating the flow of the interpolation process. The output image generation unit 11 executes the interpolation process in step S5 of FIG. 7, for example. Further, in the following flow, a case where the perpendicular line PV is shortest is described, but the same description is also applied to a case where another perpendicular line is shortest.

First, the integer coordinate point selection unit 110 selects two integer coordinate points B and B from four integer coordinate points A to D in the vicinity of the corresponding real number coordinate point P (step S51). Specifically, the integer coordinate point selection unit 110 draws a perpendicular line to each of six line segments AB, AC, AD, BC, BD, and CD from the corresponding real number coordinate point P. Further, the integer coordinate point selection unit 110 selects a perpendicular line PV among six perpendicular lines PQ, PR, PS, PT, PU, and PV, and the line segment BD relating to the perpendicular line PV, and selects two integer coordinate points Band D relating to the line segment BD.

Then, the integer coordinate point selection unit 110 derives a coordinate value of a perpendicular line intersection (real number coordinate point) V of the perpendicular line PV drawn from the corresponding real number coordinate point P with respect to the line segment BD that connects selected two integer coordinate points B and D (step S52).

The integer coordinate point selection unit 110 may select a pair of integer coordinate points using a shortest perpendicular line reference table indicating a correspondence relationship between the position (coordinate values) of the corresponding real number coordinate point Panda shortest perpendicular line. Specifically, the shortest perpendicular line reference table has an arrangement of l rows and m columns (l×m arrangement) and corresponds to an interpolation process when spaces between adjacent integer coordinate points are equally divided into l parts and m parts. l and m are 2 or greater natural numbers, which are preferably a power (for example, 16) of 2 which is optimal for a binary arithmetic operation. Further, l may be equal to m. The integer coordinate point selection unit 110 may uniquely derive the pair of integer coordinate points from the coordinate values of the corresponding real number coordinate point P using the shortest perpendicular line reference table. In addition, the shortest perpendicular line reference table may retain a correspondence relationship between the position (coordinate values) of the corresponding real number coordinate point P and the position (coordinate values) of a perpendicular line intersection. In this case, the integer coordinate point selection unit 110 may uniquely derives the coordinate values of the perpendicular line intersection from the coordinate values of the corresponding real number coordinate point P.

Then, the weight derivation unit 111 reads weights α and β on the basis of coordinate values of the perpendicular line intersection (step S53). Specifically, the weight derivation unit 111 employs a decimal part of the X coordinate value of the perpendicular line intersection as the weight α of a first pixel value specified by the integer coordinate point D. Further, the weight derivation unit 111 employs a decimal part of the Y coordinate value of the perpendicular line intersection as the weight β of a second pixel value specified by the integer coordinate point B.

The weight derivation unit 111 may represent each decimal part of the X coordinate value and the Y coordinate value of the perpendicular line intersection in n steps to be suitable for a binary arithmetic operation. Similarly, the weight derivation unit 111 may represent the weight α having a real number value which is 0 or greater and 1 or less in decimal in n steps. Here, n is a power of 2, and for example, 256. In this case, the integer coordinate point selection unit 110 derives each of decimal parts of the X coordinate value and the Y coordinate value of the perpendicular line intersection in a state of being quantified in 256 steps (8 bits). This is similarly applied to the weight α.

FIG. 13 is a diagram illustrating a relationship between a decimal part dx of an X coordinate value and a decimal part dy of a Y coordinate value of a perpendicular line intersection, and a weight α of a first pixel value. Here, dx, dy, and a are integers of decimal numbers in a range of 0 to 255, that is, values capable of being expressed by 8 bits.

As shown in FIG. 13, in a case where an integer coordinate point for specifying a first pixel is the integer coordinate point A and an integer coordinate point for specifying a second pixel is the integer coordinate point D, the weight α of the first pixel value is represented as (255−dx). Further, in a case where an integer coordinate point for specifying a first pixel is the integer coordinate point B and an integer coordinate point for specifying a second pixel is the integer coordinate point D, the weight α of the first pixel value is represented as {255−(255−dy+dx)/2}. This is similarly applied to other combinations. Division by a value "2" is realized by one-time right shift operation.

Then, the weight averaging unit 112 weight-averages values of two input pixel values specified by two integer coordinate points to derive an output pixel value (step S54). Specifically, the weight averaging unit 112 derives the output pixel value based on the weight α of the first pixel value. For example, a case where the first pixel has color data (Y1, Cb1, Cr1) of a YCbCr type and the second pixel has color data (Y2, Cb2, Cr2) may be considered. Here, Y1 and Y2 represent luminance signals, and for example, have levels of 256 steps (8 bits). Further, Cb1, Cb2, Cr1, and Cr2 represent color difference signals, and for example, have levels of 256 steps (8 bits). In this case, the luminance signal Y of an output pixel is expressed as Y={α·Y1+(255−α)·Y2}/256. Further, the color difference signal Cb of the output pixel is expressed as Cb={α·Cb1+(255−α)·Cb2}/256, and the color difference Cr is expressed as Cr={α×Cr1+(255−α)×Cr2}/256. Further, division based on the value "256" is realized by eight-time right shift operations.

With the above-described configuration, the image generation device 100 weight-averages respective values of two input pixels specified by two integer coordinate points among four integer coordinate points in the vicinity of the corresponding real number coordinate point P. Thus, it is possible to enhance image quality while suppressing an increase in an operation load. For example, the image generation device 100 can enhance the image quality by improving reproducibility of color. Thus, in an output image generated on the basis of an input image captured by the camera 2 mounted on the shovel 60, it is possible to reduce jaggies generated due to vibration of the camera 2 due to a turning operation, a traveling operation, a drilling operation, or the like of the shovel.

Further, according to the interpolation process executed by the image generation device 100, it is possible to reduce the number of executions of the weight averaging process from three to one, to thereby reduce an operation time, compared with a process of weight-averaging respective values of four input pixels specified by four integer coordinate points in the vicinity of the corresponding real number coordinate point P as in binary interpolation. In addition, according to the interpolation process executed by the image generation device 100, it is possible to realize a small amount of computation suitable for embedded mounting based on a field programmable gate array (FPGA) or the like. Thus, in the image generation device 100, it is possible to avoid mounting of a dividing circuit or the like.

Hereinbefore, the preferred embodiments of the invention have been described, but the invention is not limited to the above-described embodiments, and various modifications and replacements may be made with respect to the above-described embodiments without departing from the scope of the invention.

For example, in the above-described embodiments, the integer coordinate point selection unit 110 selects pairs of integer coordinate points by selecting the shortest perpendicular line from six perpendicular lines PQ, PR, PS, PT, PU, and PV. However, the invention is not limited to this configuration. For example, the integer coordinate point selection unit 110 may select an integer coordinate point disposed at the nearest position from a corresponding integer coordinate point and an integer coordinate point disposed at the second nearest position therefrom as pairs of integer coordinate points. Further, the integer coordinate point selection unit 110 may select pairs of integer coordinate points using another selection method.

Further, the image generation device 100 employs a cylindrical space model MD as a space model, but may employ a space model of a pillar shape such as a prism, may employ a space model formed by two surfaces of a bottom surface and a side surface, or may employ a space model only including a side surface.

In addition, the image generation device 100 is mounted on a self-propelled construction machine including a movable member such as a bucket, an arm, a boom, or a turning mechanism, together with a camera. Further, the image generation device 100 is assembled in an operation support system that supports movement of the construction machine and an operation of the movable member while presenting peripheral images to an operator. However, the image generation device 100 may be mounted on an operation target body that includes a movable member but is not self-propelled, such as an industrial machine or a fixed crane, together with a camera, and may be assembled in an operation support system that supports an operation of the operation target body.

It should be understood that the invention is not limited to the above-described embodiment, but may be modified into various forms on the basis of the spirit of the invention. Additionally, the modifications are included in the scope of the invention.

What is claimed is:

1. A periphery-monitoring device for a working machine, the periphery-monitoring device comprising:

an image processing circuitry configured to generate an output image based on an input image captured by a camera attached to the working machine, wherein pixels of the output image include four output pixels associated with respective values of four input pixels of the input image, wherein, to generate the output image based on the input image, the image processing circuitry is further configured to generate an output interpolation pixel positioned at a coordinate between the four output pixels based on values of only two input pixels specified by coordinates of two respective output pixels of the four output pixels, wherein a straight line connects two arbitrary integer coordinate points of four integer coordinate points where the four output pixels are positioned, the output interpolation pixel positioned at the coordinate between the four output pixels is generated by the image processing circuitry based on the values of the two input pixels specified by the two arbitrary integer coordinate points, and wherein the two input pixels used to generate the output interpolation pixel are selected such that a line segment between the straight line and the coordinate of the output interpolation pixel is the shortest line segment compared to line segments between respective straight lines connecting other two arbitrary integer coordinate points of the four integer coordinate points and the coordinate of the output interpolation pixel.

2. The periphery-monitoring device for the working machine according to claim 1, wherein a value of the output interpolation pixel positioned at the coordinate between the four output pixels is obtained by weight-averaging the values of the two input pixels, and in a case where a distance between two integer coordinate points where two of the four output pixels are positioned is a first distance and a distance between an intersection of a perpendicular line drawn from a real number coordinate point with respect to a line segment that connects the two integer coordinate points and a first integer coordinate point for specifying a first pixel among the two input pixels is a second distance, a weight of a value of the first pixel is a ratio of a value obtained by subtracting the second distance from the first distance, and a weight of a value of a second pixel among the two input pixels is in correspondence relationship with a ratio of the second distance to the first distance.

3. The periphery-monitoring device for the working machine according to claim 1, further comprising:

a coordinate mapping circuitry that is configured to perform mapping between coordinates in a space model disposed in a vicinity of an operation target object and coordinates in an input image plane, wherein, to generate the output image based on the input image, the image processing circuitry is further configured to associate values of a plurality of input pixels with values of a plurality of output pixels based on the coordinates in a space model to generate the output image, and wherein the image processing circuitry is further configured to generate the output image as an overhead image by a virtual viewpoint.

* * * * *